March 24, 1936.  M. P. HEINZE  2,034,902
MECHANICAL MIXER
Filed Dec. 31, 1934  3 Sheets-Sheet 1

MAX P. HEINZE
INVENTOR

PER  Albert J Fihe
ATTORNEY

March 24, 1936.　　　M. P. HEINZE　　　2,034,902
MECHANICAL MIXER
Filed Dec. 31, 1934　　　3 Sheets-Sheet 2

MAX P. HEINZE
INVENTOR

PER　　Albert J Fike

ATTORNEY

March 24, 1936.　　　　M. P. HEINZE　　　　2,034,902
MECHANICAL MIXER
Filed Dec. 31, 1934　　　3 Sheets-Sheet 3

MAX P. HEINZE
INVENTOR

PER Albert J. Fihe
ATTORNEY

Patented Mar. 24, 1936

2,034,902

UNITED STATES PATENT OFFICE 2,034,902

MECHANICAL MIXER

Max P. Heinze, Chicago, Ill.

Application December 31, 1934, Serial No. 759,828

3 Claims. (Cl. 259—75)

This invention relates to an improved mechanical cocktail shaker, and has for one of its principal objects the provision of the mechanical device for shaking cocktails or the like, wherein the desired combined shaking, churning, halting and semi-rotating movement is accomplished in a satisfactory, positive and economical manner.

One of the important objects of this invention is the provision, in a mechanical cocktail shaker or the like, of a means for supporting a container for the cocktails or other ingredients to be mixed, in a normal, horizontal position, and for shifting the same through an arc on both sides of this horizontal position, with a distinct stop and a consequent churning motion of the contained ingredients at at least one extreme of the arc of motion.

Another important object of the invention is to provide a mechanical means for mixing materials of all kinds, including drinks, desserts, chemical mixtures, the churning of butter and similar operations, wherein the rotation of a crankshaft is employed to produce a reciprocating movement which shall at the same time have a resilient control and driving means, such as imparted by the use of a spring in place of a connecting rod on the crankshaft.

Another object of the invention is to provide a quickly released clamping and holding means for the machine, whereby the cocktail shaker or other receptacle for the ingredients to be mixed, can be readily and easily fixed in position, without any danger of its subsequently becoming loose. This also includes an automatic device for holding the clamping means open whenever desired.

Another and still further important object of the invention is to provide in a mechanical mixer of the class described, a motor-driven apparatus, including a crankshaft and a spring, instead of a connecting rod, wherein the crankshaft is so connected to the motor that a considerable amount of lost motion is possible at any desired time between the constantly rotating shaft of the motor and the spasmodically rotated crankshaft, wherein the desired combination of rocking and stopping motions is produced in the mixing container or hopper.

Other and further important objects of the invention will be apparent from the disclosures in the accompanying drawings and following specifications.

The invention, in a preferred form, is illustrated in the drawings and hereinafter more fully described.

Figure 1:
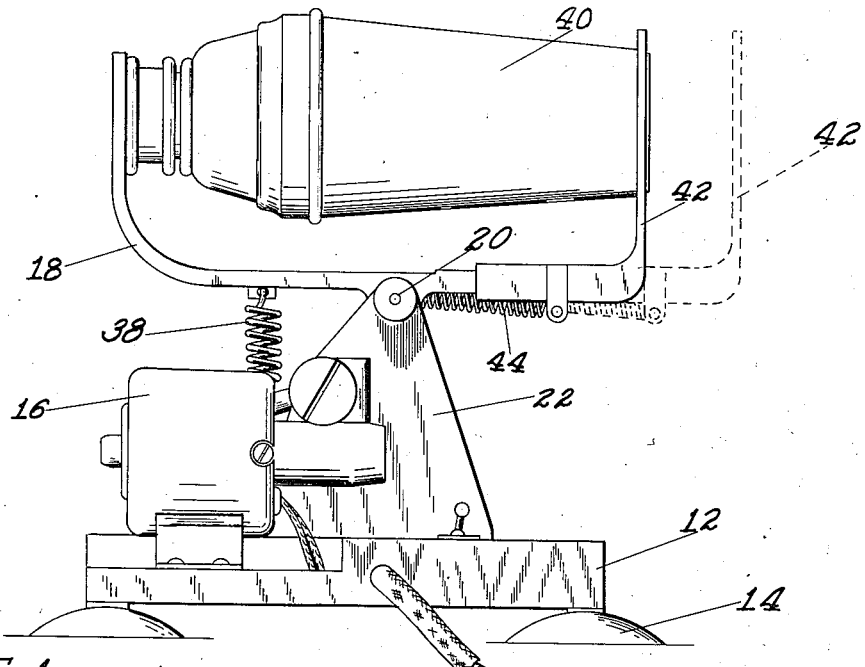
Figure 1 is a side elevation of the improved mechanical mixer of this invention.

Reference numeral 12 indicates generally a base or support for the improved mixer of this invention, the same being illustrated as comprising a cocktail mixer, but which can be used with equal facility for mixing operations of various kinds. The base 12 is preferably mounted on a set of rubber suction feet 14, whereby the same can be quite positively fixed in position on a table or other suitable support, but it will be obvious that various other supporting means may be employed, if desired or convenient.

A motor 16 is mounted on the base 12, and this motor may be of any suitable size or construction, depending upon the work to be performed.

The shaker itself comprises a support 18 tiltably mounted at 20 on brackets 22, positioned on the base 12.

Figure 2:
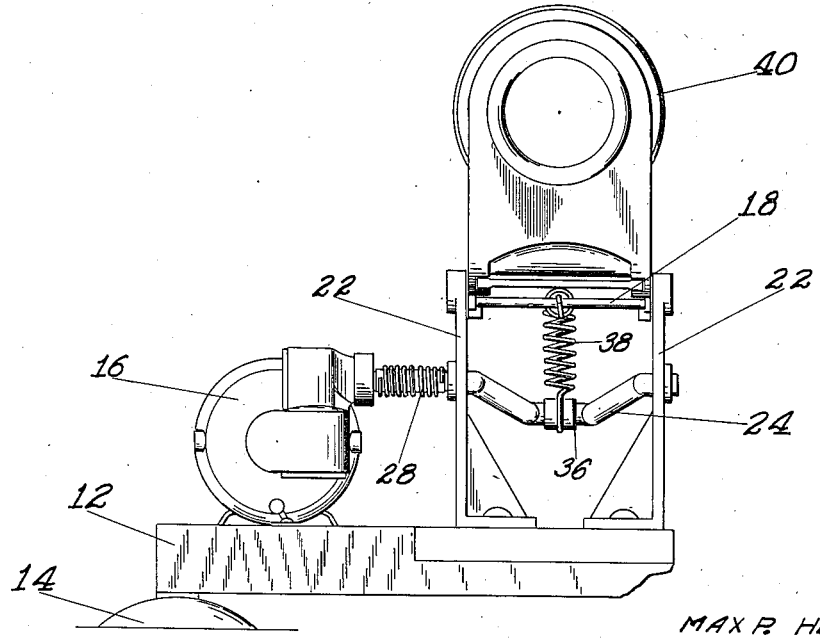
Figure 2 is an end view of the apparatus shown in Figure 1.

As best shown in Figure 2, a crankshaft 24 for rocking the support 18 is mounted in the brackets 22, and this crankshaft is driven by means of the motor 16 through a shaft 26 (Figure 4) and on account of the peculiar alternative rocking and stopping motion, which is desirable in a shaker of this type, a resilient connection is provided between the motor shaft 26 and the crank-shaft 24.

Figure 4:
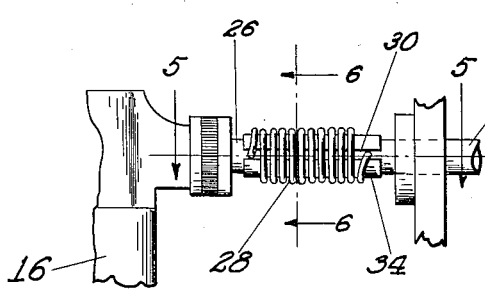
Figure 4 is a detailed view of the resilient connection between the motor shaft and the crankshaft of the mixer.
Figure 5:
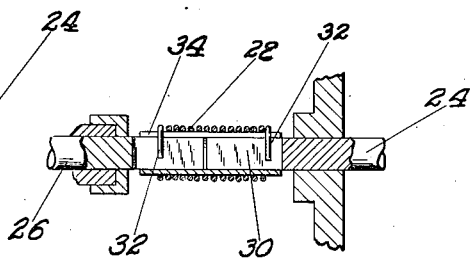
Figure 5 is a horizontal section, taken on the line 5—5 of Figure 4, looking in the direction indicated by the arrows.
Figure 6:
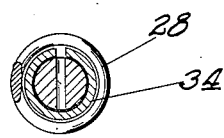
Figure 6 is a vertical section taken on the line 6—6 of Figure 4.

This comprises essentially a helical spring 28, as best illustrated in Figures 4, 5 and 6, positioned around the ends of the shafts 24 and 26, at the point where they abut each other, each shaft being longitudinally slotted at 30 for the reception of the in-turned ends 32 of the spring 28.

Positioned around the abutting ends of the shafts 24 and 26 is a split sleeve 34, as best shown in Figures 4 to 6, inclusive, this sleeve being for the purpose of keeping the shafts in alignment and also for retaining a spring in the desired position. The split portion is to allow the ends 32 of the spring to move into the slots 30, and also to provide for convenient assembly of the related parts.

Mounted on the opposite portion of the crankshaft 24 is a bearing or sleeve 36, to which is attached the end of a helical spring 38, the other end of which is connected to the rockable platform 18, which supports the cocktail shaker or other container for ingredients to be mixed.

This spring is of an open construction, as best shown in Figures 1 and 2, thereby allowing of a resilient downward motion of the rockable platform 18 after the crankshaft has reached the lowermost portion of its rotative movement, and also allowing of a similar upward resilient tensioning of the spring when the crankshaft has reached the uppermost limit of its motion with respect to the tiltable support 18.

This spring connection between the crankshaft and the platform, and also the resilient connection between the driving shaft of the motor and the crankshaft itself, produces a peculiar combination of a rocking and halting motion, which succeeds in thoroughly churning and mixing any ingredients contained in the cocktail shaker or the like, 40. The speed of the apparatus must be regulated within certain limits so as to provide this desired combination of arcuate and intermittent motion.

As best shown in Figure 1, the support for one end of the cocktail shaker comprises an integral portion of the platform 18, while the support 42 for the other end is slidably mounted on the platform and is normally impelled into a supporting and gripping relationship with the shaker 40 by means of a spring or the like, 44. This enables a ready mounting and removal of the shaker in its support, while at the same time providing against accidental dislodgement thereof during the shaking or mixing operation.

Figure 3:
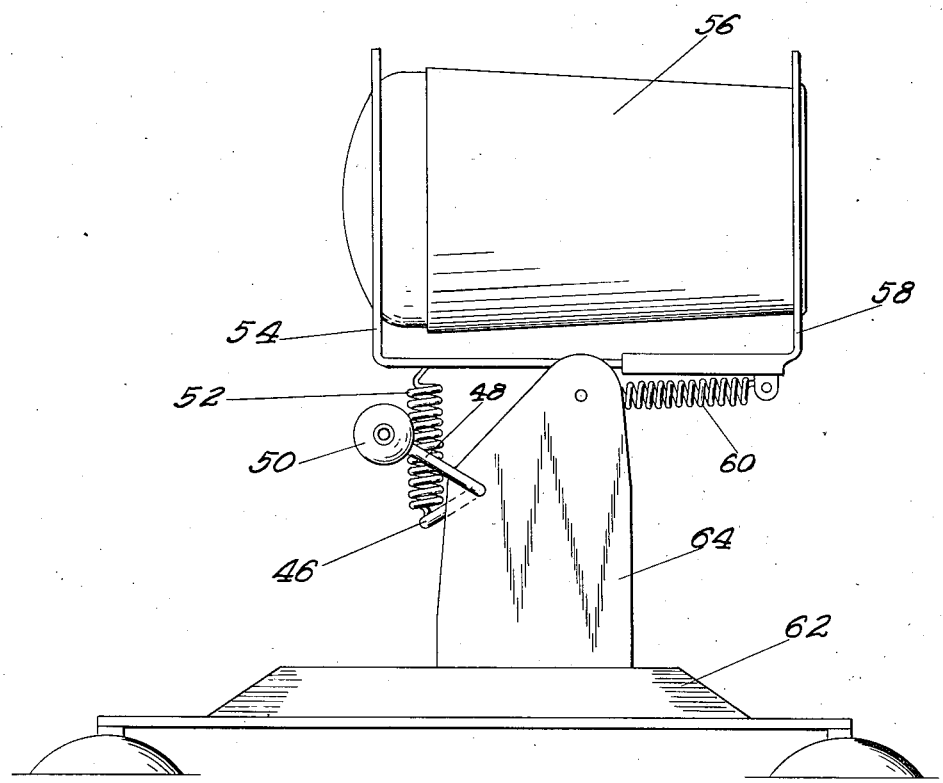
Figure 3 is a side view, illustrating a hand-operated apparatus, as distinguished from the motor-driven means of Figure 1, and also showing a slight modification of the invention.

In Figure 3 is illustrated a hand-operated mechanism, which includes a crankshaft 46, similar to the crankshaft 24 of the motor-driven device, but which has an extension 48 offset therefrom at an angle of about 60 degrees, as shown in the figure, and provided with an operating handle or the like, 50.

The spring connection 52 between the eccentric portion of the crankshaft and the corresponding tiltable platform 54 corresponds and is quite similar to the same construction illustrated in Figures 1 and 2. The shaker, or container, 56, is held in position by means of a clamping element 58, slidably supported on the platform 54 and maintained in normal clamping position by means of the usual spring 60. The entire device is mounted on a base 62 and upright brackets or bearing elements 64.

In Figures 7 to 10, inclusive, is shown a modified form of the supporting means for the shaker or container, which in this case comprises a tubular element 66, having a support 68 for one end of the shaker, mounted at one extremity thereof and fixed in position by means of a suitable pin 70. The pin is pivotally mounted at 72, having its medial portion on the supporting brackets and the like, 74, and this mounting may comprise any suitable bearing element, as for example, a fiber tube or some other satisfactory means.

Figure 7:
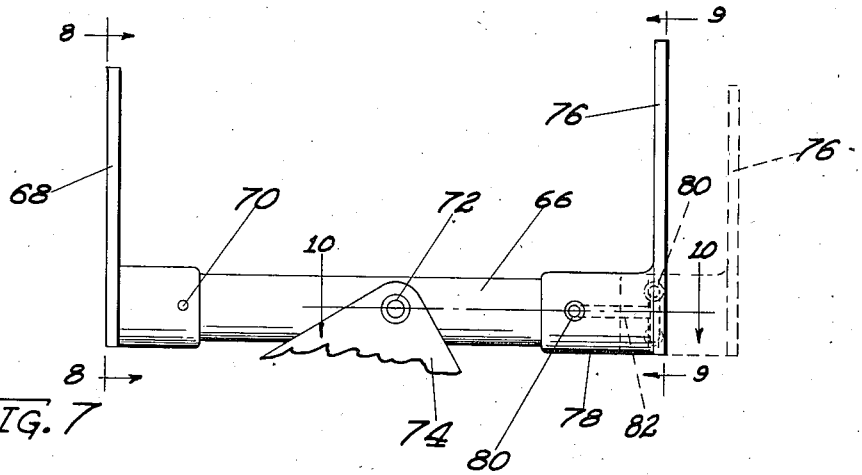
Figure 7 is a detailed view, showing a slight modification of the means for holding the container or cocktail shaker.
Figure 8:
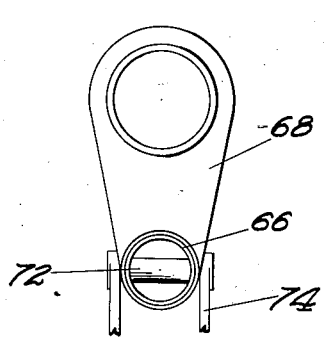
Figure 8 is an elevational view on the line 8—8 of Figure 7.
Figure 9:
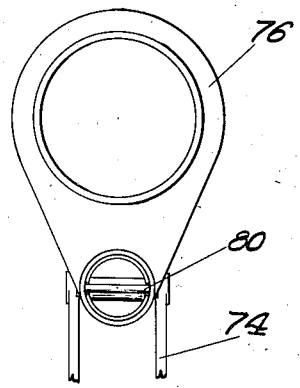
Figure 9 is an elevation on the line 9—9 of Figure 7, looking in the direction indicated by the arrows.
Figure 10:
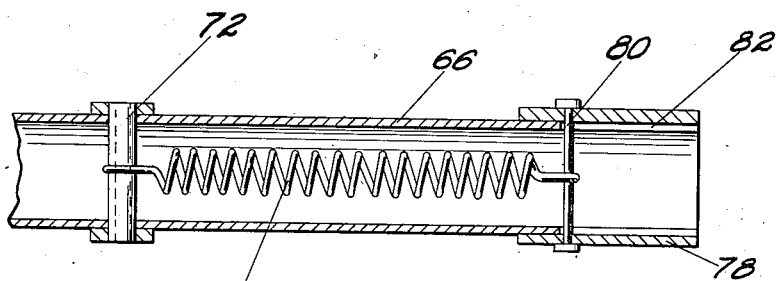
Figure 10 is an enlarged detail sectional view on the line 10—10 of Figure 7.

At the other end of the tube 66 is slidably and rotatably mounted a supporting bracket 76, which is for the rear end of the shaker, as is best shown in Figure 9, and this bracket has an integral sleeve 78, slidably mounted on the tube 66, and with a pin 80 fixed in the sleeve and adapted to slide in suitable slots 82 formed in the tube 66, as best shown in dotted lines in Figure 7 and full lines in Figure 10.

The element 76—78 is maintained in normal gripping position by means of a spring 84, which is mounted in the tube 66 and has one end affixed to the pin 80 and the other end attached to the pivot element 72, all as best shown in Figure 10.

When the support 76 is retracted rearwardly, as shown by the dotted lines in Figure 7, the pin 80 slides in the grooves 82, and after it is moved beyond the end of the tube 66, the support 76 can be rotated with regard to the tube, thereby moving the pin 80 into the position shown in the dotted lines in Figure 7, and retaining the support 76 in retracted position, enabling a ready withdrawal and replacement of the cocktail shaker, or other container, after which a slight rotation of the support 76 in order to bring 80 in alignment with the slots 82, will enable it to again assume its normal position, as shown by full lines in Figure 7. This renders the insertion and removal of the cocktail shaker a simple matter and an operation which can be performed with one hand very quickly and with the least amount of trouble.

The entire construction of all the devices is such that same can be economically manufactured, or not likely to get out of order, can be conveniently kept clean and sanitary, and furthermore, will withstand considerable usage and rough handling. The most important feature is the combination arcuate and intermittent starting and stopping motion, which closely simulates and in some ways improves upon the hand operation of shaking and mixing cocktails and other ingredients. In fact, this mixing, churning and shaking motion has been found to be adaptable for any preparation where a thorough mixing of ingredients and even an emulsification is desired.

I am aware that many changes may be made and numerous details of construction varied throughout a wide range without departing from the principles of this invention, and I, therefore, do not purpose limiting the patent granted hereon otherwise than as necessitated by the prior art.

I claim as my invention:

1. In a cocktail shaker means for supporting the container, comprising a tubular element, a pivotal mounting for the tubular element adjacent its middle, a supporting bracket for one end of the container fixed to one end of the tube, and a supporting bracket for the other end of the container slidably and rotatably mounted at the other end of the tube, and a spring in the tube connected to the movable bracket for normally urging the same into supporting and gripping position, and a pin passing through the slidable bracket and slots therefor in the tube.

2. In a cocktail shaker means for supporting the container, comprising a tubular element, a pivotal mounting for the tubular element adjacent its middle, a supporting bracket for one end of the container fixed to one end of the tube, and a supporting bracket for the other end of the container slidably and rotatably mounted at the other end of the tube, and a spring in the tube connected to the movable bracket for normally urging the same into supporting and gripping position, and a pin passing through the slidable bracket and slots therefor in the tube, the slots extending to the end of the tube, permitting withdrawal of the pin from the slots and an angular positioning of same with respect to the slots in the tube.

3. In a cocktail shaker means for supporting the container, comprising a tubular element, a pivotal mounting for the tubular element adjacent its middle, a supporting bracket for one end of the container fixed to one end of the tube, and a supporting bracket for the other end of the container slidably and rotatably mounted at the other end of the tube, and a spring in the tube connected to the movable bracket for normally urging the same into supporting and gripping position, and a pin passing through the slidable bracket and slots therefor in the tube, the slots extending to the end of the tube, permitting withdrawal of the pin from the slots and an angular positioning of same with respect to the slots in the tube to retain the bracket in retracted position against the tension of such spring.

MAX P. HEINZE.